United States Patent
Kingston et al.

(10) Patent No.: US 7,530,433 B2
(45) Date of Patent: May 12, 2009

(54) ANNULAR BRAKING DEVICE FOR A VEHICLE

(75) Inventors: Timothy Kingston, Eskilstuna (SE); Mats Åkerblom, Eskilstuna (SE)

(73) Assignee: Volvo Construction Equipment Components AB, Eskilstuna (SE)

( * ) Notice: Subject to any disclaimer, the term of this patent is extended or adjusted under 35 U.S.C. 154(b) by 0 days.

(21) Appl. No.: 10/709,483

(22) Filed: May 8, 2004

(65) Prior Publication Data

US 2005/0000759 A1    Jan. 6, 2005

Related U.S. Application Data

(63) Continuation of application No. PCT/SE02/02007, filed on Nov. 5, 2002, now abandoned.

(30) Foreign Application Priority Data

Nov. 8, 2001    (SE) .................... 0103713-4

(51) Int. Cl.
    *F16D 55/36* (2006.01)
(52) U.S. Cl. .................... 188/71.5; 192/221.1
(58) Field of Classification Search ............. 188/71.5; 180/370, 372; 475/323, 325; 192/221.1
    See application file for complete search history.

(56) References Cited

U.S. PATENT DOCUMENTS

| | | | |
|---|---|---|---|
| 2,953,040 A | 9/1960 | Christenson et al. |
| 3,115,204 A | 12/1963 | Dence |
| 4,037,694 A * | 7/1977 | Keese | 192/221.1 |
| 4,160,497 A | 7/1979 | Galicher |
| 4,317,498 A | 3/1982 | Jirousek et al. |
| 4,407,382 A | 10/1983 | Dziuba et al. |
| 4,583,428 A | 4/1986 | Garnier |
| 4,646,880 A * | 3/1987 | Logan | 188/18 A |
| 4,947,966 A | 8/1990 | Huff |
| 5,813,938 A * | 9/1998 | Forster | 475/331 |
| 6,090,006 A * | 7/2000 | Kingston | 475/323 |
| 6,290,048 B1 | 9/2001 | Kohlmeier |
| 7,179,193 B2 | 2/2007 | Kingston et al. |

FOREIGN PATENT DOCUMENTS

| | | |
|---|---|---|
| DE | 4010742 C1 | 6/1991 |
| JP | 03164330 A | 7/1991 |
| WO | 03/039900 A1 | 5/2003 |
| WO | 03/040581 A1 | 5/2003 |
| WO | WO 03/40581 * | 5/2003 |

OTHER PUBLICATIONS

International Search Report dated Feb. 7, 2003 from PCT/SE02/02007.
International Search Report dated Jan. 10, 2003 from PCT/SE02/01783.

* cited by examiner

*Primary Examiner*—Bradley T King
(74) *Attorney, Agent, or Firm*—Novak Druce + Quigg LLP

(57) ABSTRACT

An annular member (20') intended for a braking device (16') in the form of a multiple disk brake. The annular member includes a first portion which forms a part of a brake housing of the braking device and a second portion which forms a pressure surface for the disks in the braking device. The invention also relates to an arrangement for driving a wheel of a vehicle including the annular member.

7 Claims, 3 Drawing Sheets

ANNULAR BRAKING DEVICE FOR A VEHICLE

CROSS-REFERENCE TO RELATED APPLICATIONS

The present application is a continuation patent application of International Application No. PCT/SE02/02007 filed 5 Nov. 2002 which was published in English pursuant to Article 21 (2) of the Patent Cooperation Treaty, and which claims priority to both Swedish Application No. 0103713-4 filed 8 Nov. 2001 and Swedish Application No. 0104167-2 filed 11 Dec. 2001. Together with U.S. application Ser. No. 10/709, 480 filed on even date, all of the above applications are expressly incorporated herein by reference in their entireties.

TECHNICAL FIELD

The present invention relates to an annular member intended for a braking device in the form of a multiple disk brake, which annular member comprises (includes, but is not limited to) a first portion which forms a part of a brake housing of the braking device. Moreover, the invention relates to applications in which an arrangement for driving a wheel of a vehicle is included and the arrangement comprises a planetary gear transmission for transmitting power from a driving axle to a wheel hub on which a wheel is intended to be arranged, a braking device in the form of a multiple disk brake, and said annular member.

The invention can be applied in vehicles which are intended to be driven on a relatively flat surface, such as a road, and/or on uneven ground in the country.

The invention is especially applicable to a vehicle in the form of a construction machine, such as a wheel loader or an articulated or frame-steered vehicle (what is known as a dumper), but can also be applied in, for example, a truck.

Such a driving arrangement is usually arranged at a wheel which is in turn arranged at one end of a driving axle, and the gear itself is usually referred to as a hub reduction gear. The driving axle is in turn in two parts, and the parts are connected centrally by a differential gear.

BACKGROUND ART

U.S. Pat. No. 4,317,498 describes a wheel-driving arrangement comprising a planetary gear transmission. The planetary gear transmission is of a type having a stationary ring gear. The ring gear extends out from the planetary gear transmission in the axial direction and forms a brake housing for a multiple disk brake. The inner surface of the ring gear in the radial direction has a number of teeth for engagement with the planet gears arranged internally in the planetary gear transmission. These teeth extend into the brake housing part in the axial direction and form a support for the stator disks in the multiple disk brake. In other words, the engagement portions in the planetary gear transmission and in the multiple disk brake are formed by the same tooth track.

A pressure plate in the multiple disk brake is arranged in engagement with the teeth and also between the planet gears and the disk pack in the axial direction.

The pressure plate is locked in the axial direction by a locking ring. A piston is arranged on a side of the brake disks opposite the pressure plate for pressing the disks together against the pressure plate.

DISCLOSURE OF INVENTION

One object of the invention is to provide an annular member for a braking device that affords opportunities for more cost-effective production of the braking device and/or a driving arrangement comprising the braking device. Production includes more cost-effective manufacture and/or less time-consuming assembly. The invention also aims to achieve an annular member which affords opportunities for a driving arrangement with a reduced number of component parts in the arrangement and/or a weight reduction.

This object is achieved by virtue of the fact that the annular member comprises a second portion which forms a pressure surface for the disks in the braking device.

According to a preferred embodiment of the invention, the annular member comprises a third portion which is provided with teeth and forms a ring gear which in turn is intended to form part of a planetary gear transmission. In this way, three functions are integrated in one and the same element.

According to a development (variation) of the previous embodiment, the first portion is arranged at a greater distance in the radial direction of the annular member than the third portion. This affords opportunities for a constructionally simple part. The second portion preferably forms a part located between the first and third portions of the annular member.

According to another preferred embodiment of the invention, the annular member comprises a fourth portion which forms a bearing unit for mounting a hub.

In this way, four functions can be integrated in one and the same element. The fourth portion preferably comprises at least one race for receiving at least one row of balls. The fourth portion preferably forms an outer part of the ring gear in the radial direction.

A further object of the invention is to provide a driving arrangement which is more cost-effective to produce in relation to conventional designs. Production includes more cost-effective manufacture and/or less time-consuming assembly. The invention also aims to achieve a driving arrangement which affords opportunities for a reduction of the number of component parts in the arrangement and/or a weight reduction.

In at least one embodiment, objects of the invention are achieved by means of a driving arrangement having a planetary gear transmission for transmitting power from a driving axle to a wheel hub on which the wheel is intended to be arranged and a braking device in the form of a multiple disk brake, together with the above-described annular member.

According to another embodiment of the invention, the braking device and the hub are arranged on the planet carrier on different sides of the planet gear. In this way opportunities are afforded for producing a device which is compact; that is to say, requires less space in the axial direction.

According to another preferred embodiment of the invention, the hub is mounted against the annular member. To be more precise, against the annular member at a location radially outside that portion of the annular member which forms the ring gear, and also against that portion. In this way, opportunities are afforded for a device which is compact in the axial direction.

According to another preferred embodiment of the invention, the bearing arrangement between the hub and the gear-wheel comprises at least one row of balls arranged along a circular track and also between races designed in the hub and the ring gear. By virtue of such an arrangement, opportunities are afforded for a device which is cost-effective from the point of view of production and compact in the axial direction.

Further preferred embodiments and advantages of the invention will emerge from the balance of the present disclosure.

BRIEF DESCRIPTION OF THE DRAWINGS

The invention will be described in greater detail below, with reference to the embodiments shown in the accompanying drawings, and in which.

MODE FOR THE INVENTION

Figure 1:
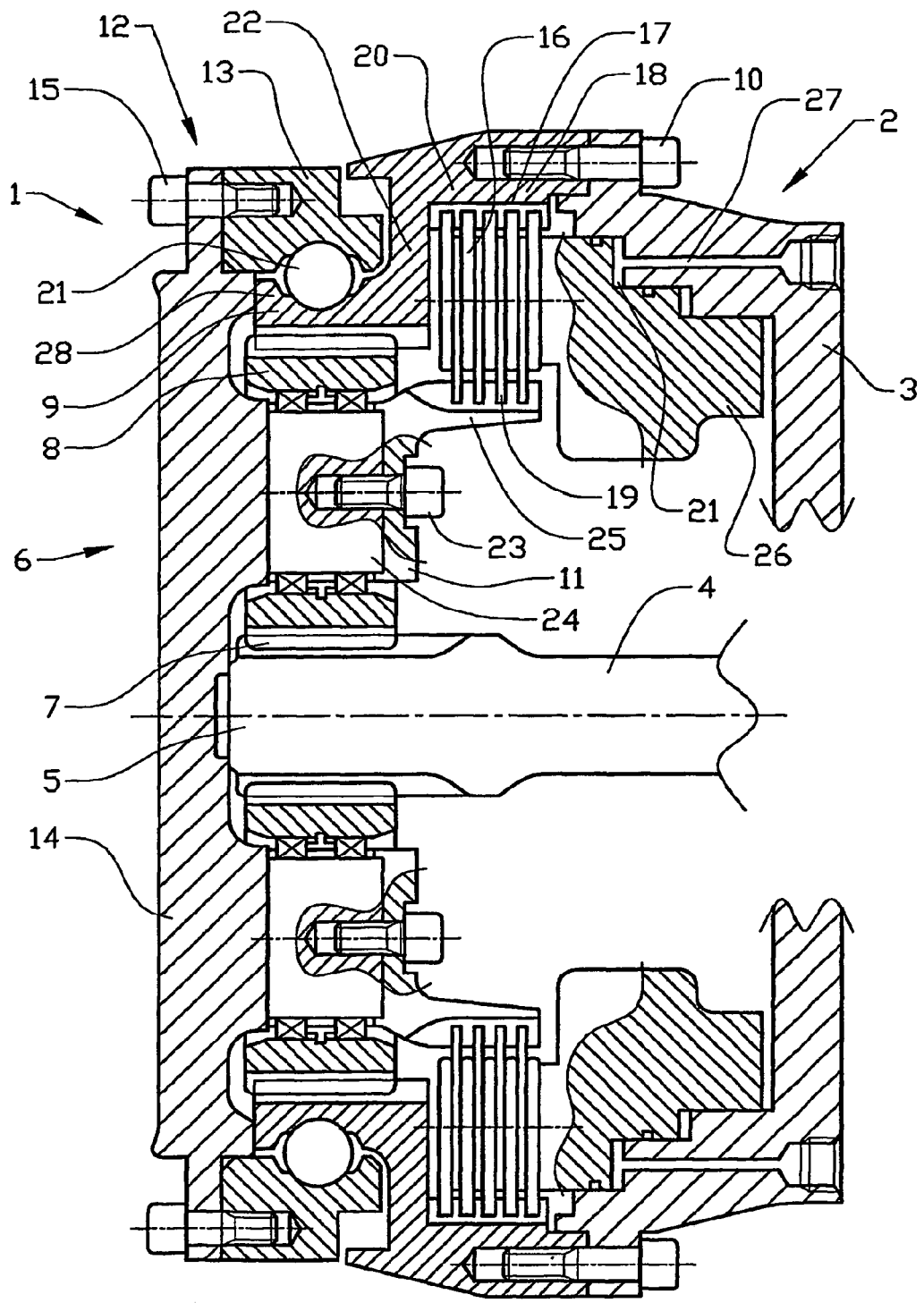
FIG. 1 shows a diagrammatic, partly cut-away side view of the invention configured according to a first embodiment thereof.
Figure 1A:
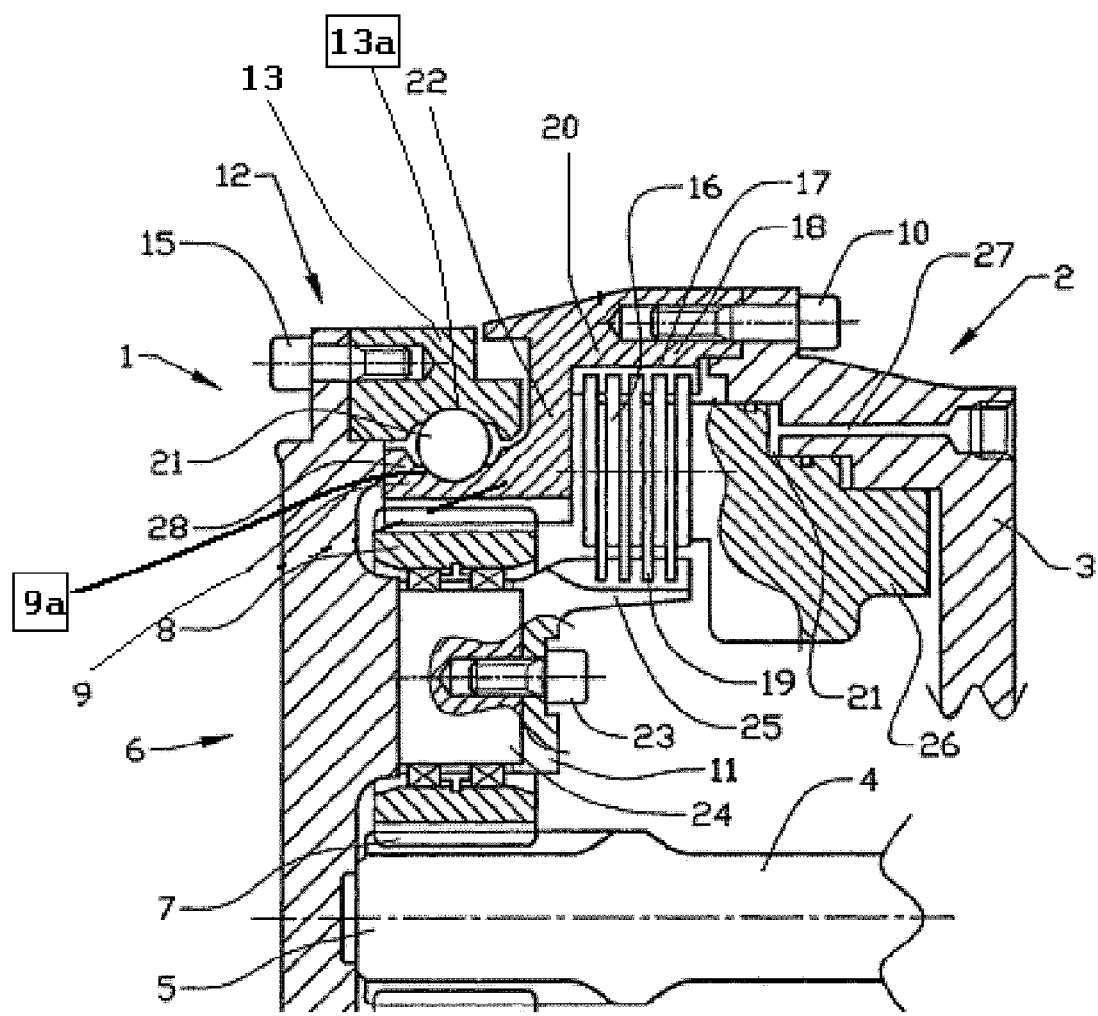

FIG. 1 shows a first embodiment of a driving arrangement 1 in a diagrammatic side view. The driving arrangement 1 is arranged at one end of the axle case 3 of a wheel axle 2. A driving axle 4 extends inside the axle case 3. The driving axle 4 is, at one 5 of its ends, provided with a hub reduction gear 6 in the form of a planetary gear transmission. At its other end, the driving axle 3 is operationally connected to a central gear (not shown) which, via a drive shaft, is driven by the engine of the vehicle.

According to conventional design, the planetary gear transmission 6 comprises a sun gear 7, a number of planet gears 8 and a ring gear 9, which are arranged in driving interconnection via teeth. The planetary gear transmission 6 is of a type with a stationary ring gear, and the ring gear 9 is here connected firmly to the axle case 3 via screw joints 10.

A planet carrier 11, also known as a planet gear holder, is adapted so as to hold the planet gears 8. More precisely, the planet gears 8 are mounted on the planet carrier 11. The number of planet gears 8 in the preferred embodiment is three, but, within the scope of the invention, the number of planet gears can be one, two, four or more.

The driving arrangement comprises an annular member 20 which in turn comprises a first portion 18 which forms a part of a housing for a braking device 16, and a second portion 22 which forms a pressure surface for the disks in the braking device 16. The annular member 20 also comprises a third portion 9 which forms the ring gear in the planetary gear transmission.

The braking device 16 includes a wet brake in the form of a multiple-disk brake. The braking device 16 comprises two sets of brake disks which rotate in relation to one another during operation. A first set of brake disks (stator disks) is connected to the first portion 18 of the annular member 20, which portion is arranged outside the planet carrier 11 in the radial direction.

The first portion 18 of the annular member 20 is arranged outside the stator disks in the radial direction. The first portion 18 also comprises internally arranged guide surfaces 17 for engagement with and guidance in the axial direction of the stator disks when the braking device 16 is activated. The guide surfaces 17 consist of a number of parallel ridges, or teeth, which extend in the axial direction.

In this case, the connection between the annular member 20 and the stator disks consists, to be precise, of a spine joint 17.

A second set of brake disks (rotor disks) is connected to the planet carrier 11. The planet carrier 11 has guide surfaces, similar to those described above for the annular member 20, in the form of a number of parallel ridges, or teeth, for engagement with and guidance in the axial direction of the rotor disks when the braking device 16 is activated. Here, the connection also consists of a spline joint 19.

The brake disks are connected to the respective part in a rotationally fixed manner and are displaceable in the axial direction on the spline joints 17, 19. In a conventional manner, the brake disks belong alternately to the first set and to the second set. The planet carrier 11, which is connected firmly to the hub 12 and thus has the same speed as the wheel during operation, is in this way braked against the static part 18.

The braking device 16 also comprises a brake piston 26 for applying the brake by pressing the brake disks together and thus increasing the friction between them.

A duct 27 for supplying oil for applying the brake is coupled to the brake piston. On an opposite side of the brake disks relative to the brake piston 26, the second portion 22 of the annular member 20 forms a pressure surface, or stay, against which the disks are brought when the brake is applied. The first portion 18 is annular, and the pressure surface extends, to be precise, in a plane essentially at right angles to a central axis of the annular first portion 18.

By means of this type of braking device 16, the wheel is braked directly. By virtue of the fact that the wheel is braked directly, that is to say the braking takes place after the planetary gear transmission 6, a part is braked which has a lower rotation speed relative to the driving axle (the driving axle usually has a speed which is approximately six times higher than that of the wheel). In this way, it is possible to obtain very good adjustability of the braking, which is especially advantageous for application in vehicles which require great braking power within a large speed range. Such a vehicle consists of, for example, a dumper.

As emerges from the description above, the first and the second portions 18,22 are therefore integrated in one piece.

The second portion 22 of the annular member 20 projects inward in the radial direction from the first portion 18. The second portion 22 is furthermore continuous in the peripheral direction of the annular member.

The first portion 18 of the annular member 20 is arranged in a first position in the radial direction.

The third portion 9, in the form of the ring gear, of the annular member 20 is arranged in a second position at a smaller distance in the radial direction than the first portion. The second portion 22 of the annular member 20, which forms the pressure surface for the brake disks, is arranged between the first and third portions. This intermediate portion 22 extends in the radial direction and connects the ring gear 9 and the brake housing part 18. The first and third portions 18, 9 also project in different directions in the axial direction from the second portion 22. The first, second and third portions of the annular member are therefore integrated in one piece. As shown in FIG. 1, the first portion 18, subtends a ninety degree angle with the second portion 22, which subtends a ninety degree angle with the third portion 9. The first portion 18 and the third portion 9 each form a right angle at the point of intersection with the second portion 22. In this way the second portion 22 has an orthogonal relationship to the first portion 18 and the third portion 9.

The annular member 20 also comprises a fourth portion 28 for mounting a hub 12. The hub 12 is intended to carry a wheel (not shown) and is mounted outside the third portion or ring gear 9 in the radial direction and also against it. The fourth portion 28 is therefore integrated in the third portion 9 here.

The wheel hub 12 is also connected firmly to the planet carrier 11. In the embodiment shown, in FIG. 1, the hub 12 comprises an annular part 13 and a disk-shaped cover 14 connected firmly to the annular part 13. The annular part 13 is arranged outside the ring gear 9 in the radial direction and is also mounted against it. This is described in greater detail below. The annular part 13 and the disk-shaped cover 14 are interconnected firmly via screw joints 15.

The cover 14 is arranged outside the planetary gear transmission 6 in the axial direction and protects the latter from the external environment. The hub 12, and to be precise the cover 14, is connected firmly to the planet carrier 11. The wheel is fastened by a conventional fastening device (not shown) on the hub 12, usually a bolt joint.

The annular member 20 therefore has a number of functions such as: it functions as a holder for the planetary gear transmission 6, that is to say it is connected firmly to the axle case 3 by way of screw joints 10 to the first portion 18, it functions as a brake housing and pressure surface for the braking device 16, and it functions as a bearing unit 21 including the fourth portion 28 for mounting the wheel hub 12. By connecting the axle case 3 to the first portion 18 and providing the fourth portion 28 for mounting the wheel hub 12, the annular member 20 provides attachment of the hub 12 to the axle case 3. The bearing arrangement or unit 21 between the annular part 13 and the ring gear 9 comprises a row of a number of balls arranged along a circular track between races 9a, 13a designed in the annular part 13 and the ring gear 9 also referred to herein as the third portion. The third portion 9 has an outer surface having at least one race 9a formed therein. An opposing race 13a in an inner face of the annular part 13 has alignment with the at least one race 9a in the outer surface of the ring gear 9. The inner face of the annular part 13 overlaps at least a portion of the outer surface of the ring gear 9 to provide the bearing unit or arrangement 21 comprising the outer surface and the annular part 13 to retain balls between the at least one race 9a and the opposing race 13a. Such a bearing arrangement 21 is often referred to as a four-point bearing owing to the fact that four surfaces are ground for contact with the balls. In order to form the bearing arrangement 21, a number of balls are therefore mounted in the space formed by alignment of the at least one race 9a with the opposing 13a in between the ring gear 9 and the annular part 13. In other words, there is no conventional ball bearing between the parts. Race means that a surface area is designed for receiving the balls. This surface area usually has a curved or angled shape.

The word "annular" used above is to be understood in a wide sense, and the term annular includes various forms of at least essentially circular structures which are continuous in the peripheral direction. The first annular portion 18 has the shape of a ring and consists of a continuous structure in the peripheral direction with an extent in the axial direction. The inner surface of the first portion 18 in the radial direction also defines an essentially circular shape for receiving the stator disks.

The braking device 16 and the hub 12 are arranged on different sides of the planet gears 8. To be precise, the braking device 16 is arranged on the planet carrier 11 for direct braking thereof relative to the annular member 20. The hub 12 is in turn connected firmly to the planet carrier 11. The planet gears 8 are mounted on pivots 24 which project from the disk-shaped cover 14. That part 25 of the planet carrier 11 which forms the brake housing is connected to the pivots 24 via screw joints 23. According to an alternative embodiment, the planet carrier part 24 and the brake housing part 25 are formed in one piece.

Figure 2:
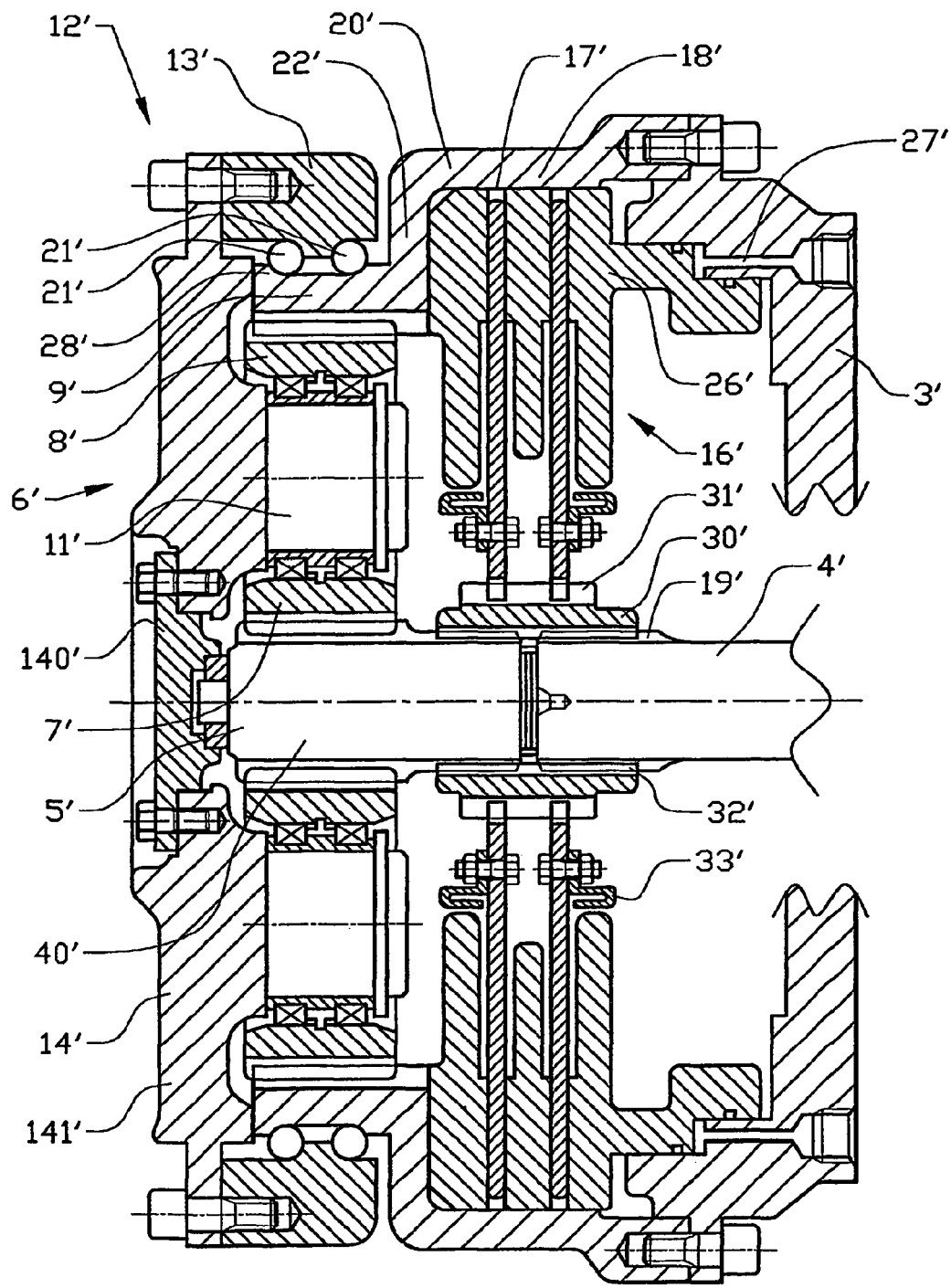
FIG. 2 shows a diagrammatic, partly cut-away side view of the invention according to a second embodiment.

FIG. 2 illustrates a second embodiment of the invention. This embodiment differs from the first embodiment in that the rotor disks in the braking device 16' are connected in a rotationally fixed manner to the driving axle 4' instead of to the planet carrier 11'. This is brought about by virtue of a sleeve 30' being arranged around the driving axle 4'. The sleeve 30' has internal guide surfaces in the form of splines 32' engagement with guide surfaces in the form of splines 19' the axle 4' and external guide surfaces in the form of splines 31' rotationally fixed engagement with the brake disks intended for rotation.

The driving axle 4' which is also divided and the axle portion 40' forms the axle end 5' constituting a part of the sun gear 7'. The cover 14' consists of two parts here, a first, central part 140' arranged outside the sun gear 7' the axial direction. The first cover part 140' detachably connected, via a screw joint, to a radially outer, second cover part 141' has a sufficiently great extent in order, when removed, to form a sufficiently large hole for access to the sun gear 7'. In this way, access to the internal components from outside is facilitated without it being necessary to remove the tire of the vehicle, which is especially advantageous in servicing vehicles with heavy tires.

The sleeve 30' extends over a part of the axle portion 40', and its internal guide surfaces 32' are also arranged in rotationally fixed engagement with corresponding external guide surfaces of the axle portion 40'. In this way, the power is transmitted from the driving axle 4' to the sun gear 7' during operation.

A number of members 33' are furthermore firmly connected to the rotation disks for the purpose of providing the friction surfaces between the disks with oil. Such a member 33 is usually referred to as an impeller.

The annular member 20' comprises parts corresponding to those described above for the embodiment in FIG. 1, but with slightly modified dimensions and shapes.

FIG. 1 also shows the bearing arrangement 21 in the form of a row of balls which are received in races in the hub and the ring gear. FIG. 2 shows the bearing arrangement 21' in the form of two rows of balls, which rows are arranged with a mutual spacing in the axial direction. This type of bearing arrangement is usually referred to as an angular contact bearing. According to another conceivable alternative, other types of bearing arrangements can be used, such as roller bearings and then in particular conical roller bearings.

The multiple disk brake described above is sometimes referred to as a friction brake, and one set of brake disks is then referred to as friction disks while the other set of brake disks is referred to as reaction disks.

The invention is not to be regarded as being limited to the illustrative embodiments described above, but a number of further variants and modifications are conceivable within the scope of the patent claims which follow. For example, the application may differ, or the engine of the vehicle may be arranged so as to drive the driving axle 4 directly, that is to say without an intermediate drive shaft and central gear.

The invention claimed is:

1. An annular member for a braking device utilizing a multiple disk brake, the annular member comprising:
   an axially extending first portion,
   a radially extending second portion, and
   an axially extending third portion,
   the first portion being radially located outside the third portion and joined thereto by the second portion, which has an orthogonal relationship to the first portion and the third portion, the first portion having a radially inner surface configured to provide rotation-preventing attachment for disks in the multiple disk brake, the third portion having a radially inner surface provided with teeth and forming a ring gear configured to form part of a planetary gear transmission, the third portion further having a radially outer surface having at least one bearing member-receiving race formed therein, the first portion being adapted for fixed attachment to an axle case.

2. The annular member as recited in claim 1, wherein the first portion has a ring shape.

3. The annular member as recited in claim 2, wherein the second portion projects inward in the radial direction from the first portion.

4. The annular member as recited in claim 1, wherein the first portion comprises guide surfaces for guidance in the axial direction of at least one first brake disk when the braking device is activated.

5. The annular member as recited in claim 4, wherein the guide surfaces consist of a number of parallel ridges which extend at least partially in the axial direction.

6. The annular member as recited in claim 1, wherein the first portion and the third portion are arranged at different distances in the radial direction of the annular member.

7. The annular member as recited in claim 1, wherein the second portion has a pressure surface formed at one end of the ring gear in the axial direction of the annular member.

* * * * *